(12) United States Patent
Abdolvand et al.

(10) Patent No.: US 9,160,137 B1
(45) Date of Patent: Oct. 13, 2015

(54) METHOD AND DEVICE FOR CREATING SUPERCONTINUUM LIGHT PULSES

(71) Applicants: Amir Abdolvand, Erlangen (DE); Federico Belli, Erlangen (DE); John Travers, Erlangen (DE); Philip Russell, Rottenbach (DE)

(72) Inventors: Amir Abdolvand, Erlangen (DE); Federico Belli, Erlangen (DE); John Travers, Erlangen (DE); Philip Russell, Rottenbach (DE)

(73) Assignee: Max-Planck-Gesellschaft zur Förderung der Wissenschaften e. V., Munich (DE)

( * ) Notice: Subject to any disclaimer, the term of this patent is extended or adjusted under 35 U.S.C. 154(b) by 0 days.

(21) Appl. No.: 14/273,680

(22) Filed: May 9, 2014

(51) Int. Cl.
  *H01S 3/30* (2006.01)
  *H01S 3/11* (2006.01)

(52) U.S. Cl.
  CPC .. *H01S 3/302* (2013.01); *H01S 3/11* (2013.01)

(58) Field of Classification Search
  USPC ........................................ 372/3, 8, 25, 27, 30
  See application file for complete search history.

(56) References Cited

U.S. PATENT DOCUMENTS

| | | | | |
|---|---|---|---|---|
| 7,519,253 | B2 * | 4/2009 | Islam | 385/122 |
| 2010/0079853 | A1 * | 4/2010 | Rakich et al. | 359/334 |
| 2012/0281209 | A1 * | 11/2012 | Bai | 356/301 |

OTHER PUBLICATIONS

J. M. Dudley et al., "Ten years of nonlinear optics in photonic crystal fibre", Nature Photonics 3, 85-90 (2009).
N. Savage, "Supercontinuum sources", Nature Photonics 3, 114-115 (2009).
H. Imam, "Metrology: Broad as a lamp, bright as a laser", Nature Photonics 2, 26-28 (2008).
F. Reiter et al. "Generation of sub-3 fs pulses in the deep ultraviolet", Opt. Lett. 35, 2248 (2010).
F. Reiter et al. "Route to Attosecond Nonlinear Spectroscopy", PRL 105, 243902 (2010).
S. P. Stark et al. "Extreme supercontinuum generation to the deep UV", Opt. Lett. 37, 770-772 (2012).
M. Nisoli et al. "Generation of high energy 10 fs pulses by a new pulse compression technique", Appl. Phys. Lett. 68, 2793 (1996).
K. F. Mak et al. "Two techniques for temporal pulse compression in gas-5 filled hollow-core kagomé photonic crystal fiber", Opt. Lett. 38, 3592-3595 (2013).
K. F. Mak et al. "Tunable vacuum-UV to visible ultrafast pulse source based on gas-filled Kagome-PCF", Opt. Express 21, 10942-10953 (2013).
P. Hölzer et al. "Femtosecond Nonlinear Fiber Optics in the Ionization Regime", Phys. Rev. Lett. 107, 203901 (2011).
European application No. 13002465.6, filed May 8, 2013.

(Continued)

*Primary Examiner* — Dung Nguyen
(74) *Attorney, Agent, or Firm* — Grogan, Tuccillo & Vanderleeden LLP (57) ABSTRACT

A method of spectrally broadening light pulses includes the steps of providing the light pulses with a laser source, said light pulses having a pulse duration below 1 ps, in-coupling the light pulses into a hollow optical waveguide device, and spectrally broadening the light pulses propagating along the pulse guiding medium by subjecting them to a Raman nonlinearity via excitation of a Raman polarization having a first Raman period, wherein the optical waveguide device subjects the light pulses to anomalous group velocity dispersion which combines with the spectral broadening of the light pulses to result in a Raman-enhanced self-compression of the light pulses, and the light pulses further propagate along the optical waveguide device such that the Raman-enhanced self compression results in a further excitation of a Raman polarization having a second Raman period which is faster than the first Raman period.

14 Claims, 5 Drawing Sheets

(56) References Cited

OTHER PUBLICATIONS

J. C. Travers et al. "Ultrafast nonlinear optics in gas15 filled hollow-core photonic crystal fibers", JOSA B 28, A11-A26 (2011).
A. Nazarkin et al. "Generation of multiple phase-locked Stokes and anti-Stokes components in an impulsively excited Raman medium", Phys. Rev. Lett. 83, 2560-2563 (1999).
A. Abdolvand et al. "Generation of a phase-locked Raman frequency comb in gas-filled hollow-core photonic crystal fiber", Opt. Lett. 37, 4362 (2012).
A. Chugreev et al. "Manipulation of coherent Stokes light by transient stimulated Raman scattering in gas filled hollow-core PCF", Opt. Express 17, 8822 (2009).
A. Nazarkin et al. "All linear control of attosecond pulse generation", Opt. Comm. 203, 403 (2002).
C. Conti et al. "Highly noninstantaneous solitons in liquid-core photonic crystal fibers", Phys. Rev. Lett. 105, 30 263902 (2011).
S. Baker et al. "Femtosecond to attosecond light pulses from a molecular modulator", Nat. Photonics 5, 664-671 (2011).
R. A. Bartels et al. "Impulsive stimulated Raman scat35 tering of molecular vibrations using nonlinear pulse shaping", Chem. Phys. Lett. 374, 326-333 (2003).
Mamyshev et al. Phys. Rev. Lett. 71, 73 (1993).
F. Couny et al. Science 318, 118 (2007).
S. Zaitsu et al. J. Opt. Soc. Am. B 22, 2642-2650 (2005).
J.Ringling et al. 5 "Tunable femtosecond pulses in the near vacuum ultraviolet generated by frequency conversion of amplified Ti:sapphire laser pulses", Opt. Lett. 18, 2035-2037 (1993).
V. Petrov et al. "Frequency conversion of Ti: sapphire10 based femtosecond laser systems to the 200-nm spectral region using nonlinear optical crystals", Sel. Top. Quantum Electron. IEEE J. Of 5, 1532-1542 (1999).
Chang et al. "Influence of ionization on ultrafast gas-based nonlinear fiber optics", Optics Express, vol. 19, No. 21, 2011.
Conti et al. "Multiple hydrodynamical shocks induced by the Raman effect in photonic crystal fibers", Physical Review, A 82, 2010, pp. 013838-1 to 013838-6.
Durfee III et al. "Intense 8-fs pulse generation in the deep ultraviolet", Optics Letters, vol. 24, No. 10, 1999.
Goehlich et al. "Increased efficiency of vacuum ultraviolet generation by stimulated anti-Stokes Raman scattering with Stokes seeding", Applied Optics, vol. 37, No. 36, 1998, pp. 8453-8459.
Joly et al. "Bright Spatially CoherentWavelength-Tunable Deep-UV Laser Source Using an Ar-Filled Photonic Crystal Fiber", Physical Review Letters, PRL 106, 203901 (2011).
Kalosha et al. "Phase Relations, Quasicontinuous Spectra and Subfemtosecond Pulses in High-Order Stimulated Raman Scattering with Short-Pulse Excitation", Physical Review Letters, Vol. 85, No. 6, 2000.
Kien et al. "Pulse compression by parametric beating with a prepared Raman coherence", Physical Review A, 66, 023813, 2002.
Kien et al. "Subfemtosecond pulse generation with molecular coherence control in stimulated Raman scattering", Physical Review A, vol. 60., No. 2, 1999.
Zheltikov et al. "Frequency-Tunable Multigigawatt Sub-Half-Cycle Light Pulses from Coupled-State Dynamics of Optical Solitons and Impulsively Driven Molecular Vibrations", Physical Review Letters, PRL 105, 103901 (2010).
Tani et al. "Multimode ultrafast nonlinear optics in optical waveguides: numerical modeling and experiments in kagomé photonic-crystal fiber", J. Opt. Society, vol. 31, No. 2, 2014.
Sokolov et al. "Ultrashort pulse generation by molecular Modulation", Journal of Optics B, Quantum Semiclass. Opt. 5 (2003) R1-R26.
Shitamichi et al. "High-order Raman sidebands generated from the near-infrared to ultraviolet region by fourwave Raman mixing of hydrogen using an ultrashort two-color pump beam", Optics Express, vol. 20, No. 25, 2012.
Korn et al. "Observation of Raman Self-Conversion of fs-Pulse Frequency due to Impulsive Excitation of Molecular Vibrations", Physical Review Letters, vol. 81, No. 6, 1998.

\* cited by examiner

METHOD AND DEVICE FOR CREATING SUPERCONTINUUM LIGHT PULSES

FIELD OF THE INVENTION

The present invention relates to a method of spectrally broadening light pulses, in particular using an optical waveguide having a Raman nonlinearity. Furthermore, the present invention relates to a light pulse source device for generating light pulses, in particular comprising a pump laser source and a medium-filled hollow optical waveguide device. Applications of the invention are available in the fields of e.g. biomedical imaging, metrology, spectroscopy and material processing.

TECHNICAL BACKGROUND OF THE INVENTION

In the present specification, reference is made to the following publications cited for illustrating prior art techniques, in particular conventional non-linear optics and techniques of spectrally broadening of laser light pulses.

[1] J. M. Dudley et al., "Ten years of nonlinear optics in photonic crystal fibre", Nature Photonics 3, 85-90 (2009);
[2] N. Savage, "Supercontinuum sources", Nature Photonics 3, 114-115 (2009);
[3] H. Imam, "Metrology: Broad as a lamp, bright as a laser", Nature Photonics 2, 26-28 (2008);
[4] F. Reiter et al. "Generation of sub-3 fs pulses in the deep ultraviolet", Opt. Lett. 35, 2248 (2010);
[5] F. Reiter et al. "Route to Attosecond Nonlinear Spectroscopy", PRL 105, 243902 (2010);
[6] S. P. Stark et al. "Extreme supercontinuum generation to the deep UV", Opt. Lett. 37, 770-772 (2012);
[7] M. Nisoli et al. "Generation of high energy 10 fs pulses by a new pulse compression technique", Appl. Phys. Lett. 68, 2793 (1996);
[8] K. F. Mak et al. "Two techniques for temporal pulse compression in gas-filled hollow-core kagomé photonic crystal fiber", Opt. Lett. 38, 3592-3595 (2013);
[9] K. F. Mak et al. "Tunable vacuum-UV to visible ultrafast pulse source based on gas-filled Kagome-PCF", Opt. Express 21, 10942-10953 (2013);
[10] P. Hölzer et al. "Femtosecond Nonlinear Fiber Optics in the Ionization Regime", Phys. Rev. Lett. 107, 203901 (2011);
[11] European application No. 13002465.6, not published on the priority date of the present specification;
[12] J. C. Travers et al. "Ultrafast nonlinear optics in gas-filled hollow-core photonic crystal fibers", JOSA B 28, A11-A26 (2011);
[13] A. Nazarkin et al. "Generation of multiple phase-locked Stokes and anti-Stokes components in an impulsively excited Raman medium", Phys. Rev. Lett. 83, 2560-2563 (1999);
[14] A. Abdolvand et al. "Generation of a phase-locked Raman frequency comb in gas-filled hollow-core photonic crystal fiber", Opt. Lett. 37, 4362 (2012);
[15] A. Chugreev et al. "Manipulation of coherent Stokes light by transient stimulated Raman scattering in gas filled hollow-core PCF", Opt. Express 17, 8822 (2009);
[16] A. Nazarkin et al. "All linear control of attosecond pulse generation", Opt. Comm. 203, 403 (2002);
[17] C. Conti et al. "Highly noninstantaneous solitons in liquid-core photonic crystal fibers", Phys. Rev. Lett. 105, 263902 (2011);
[18] S. Baker et al. "Femtosecond to attosecond light pulses from a molecular modulator", Nat. Photonics 5, 664-671 (2011);
[19] R. A. Bartels et al. "Impulsive stimulated Raman scattering of molecular vibrations using nonlinear pulse shaping", Chem. Phys. Lett. 374, 326-333 (2003);
[20] Mamyshev et al. Phys. Rev. Lett. 71, 73 (1993);
[21] F. Couny et al. Science 318, 118 (2007);
[22] S. Zaitsu et al. J. Opt. Soc. Am. B 22, 2642-2650 (2005);
[23] J. Ringling et al. "Tunable femtosecond pulses in the near vacuum ultraviolet generated by frequency conversion of amplified Ti:sapphire laser pulses", Opt. Lett. 18, 2035-2037 (1993); and
[24] V. Petrov et al. "Frequency conversion of Ti:sapphire-based femtosecond laser systems to the 200-nm spectral region using nonlinear optical crystals", Sel. Top. Quantum Electron. IEEE J. Of 5, 1532-1542 (1999).

The development of bright supercontinuum (SC) sources based on solid-core photonic crystal fibers has already revolutionized fields as diverse as frequency metrology, optical coherence tomography [12] and confocal microscopy [3], and is finding ever-increasing applications in biotechnology and the life sciences. A challenge to the further development of these sources is the extension of the short-wavelength edge into difficult-to-access spectral regions such as the deep UV (DUV) and vacuum UV (VUV), where material damage essentially rules out the use of solid-state materials. Currently a tunable broadband source in the UV/VUV spectral region does not exist. Broadband coherent sources in this spectral region could also be used for synthesizing single-cycle pulses in UV/DUV, thus extending sub-femtosecond science to a new spectral region.

Conventional techniques for generating radiation in the above short-wavelength range comprise e.g. high harmonic generation (HHG) or third harmonic generation (THG). HHG has disadvantages as it cannot produce a continuum covering the UV-VUV spectral region. Furthermore, one of its greatest drawbacks is its low conversion efficiency ($10^{-6}$ at best). THG allows the generation of pulses with a broad spectrum in UV spectral region, which, however, have a limited bandwidth only, like e.g. 60 nm centred at 266 nm [4]. Furthermore, the spatiotemporal transformation of a single-cycle near-IR pulse in a pressurized quasi-static gas cell has been suggested for generating a UV-DUV supercontinuum in the energy range of 4 to 8 eV, i.e., 138 to 310 nm [5]. However, this techniques using the nonlinear pulse propagation in filaments has disadvantages in terms of an extreme sensitivity of the process to pump pulse parameters, resulting in a limited use with high energy (mJ) single cycle pump pulses in near-IR (about 4 fs). Another conventional approach is based on pulse broadening in tapered silica photonic crystal fibres allowing a frequency conversion down to 280 nm [6]. This technique has a restricted practical application as the lifetime of the system is rather short owing to cumulative colour centre damage to the glass when exposed to UV light over long periods of time. In the deep and vacuum UV, material loss and severe damage problems rule out the use of silica.

A further commonly employed technique for generating visible to IR supercontinua is nonlinear spectral broadening in α-pillary fibres filled with noble gases [7]. An ultrashort pump pulse, launched into the capillary, experiences self-phase modulation and strong spectral broadening. Large core (about 200 µm) capillaries must however be used to limit the propagation loss, which means that the waveguide dispersion of the empty capillary is only very weakly anomalous. When filled with gas (noble or Raman-active) at any reasonable pressure, the dispersion becomes strongly normal in the UV to near-IR spectral region. The result is a rapid broadening of the spectrum without any pulse self-compression. The absence of very short intense spectral features means that impulsive driving of the molecular motion in a Raman-active gas cannot occur, which in turn means that spectral super-broadening cannot be observed. Broadband-guiding hollow-core photonic crystal fibres, showing much stronger anomalous dispersion over a wide spectral window, provide a perfect solution to this problem.

The use of a noble gas in a hollow-core photonic crystal fiber (PCF) has enabled the generation of self-compressed pulses [8], emission of tunable deep-UV light [9], and plasma-driven frequency conversion [10, 11]. Hollow-core PCF is a unique host for gas-based nonlinear optical experiments as it offers low-loss single-mode guidance in a micron-sized hollow core along with pressure-tunable dispersion and nonlinearity. In previous work, noble gases have been used as Raman-free nonlinear media, permitting efficient soliton-based pulse compression where the interplay between Kerr nonlinearity and anomalous dispersion results in dramatic self-compression of an ultrashort pulse. Novel phenomena such as UV wavelength conversion and even plasma generation from 50 fs laser pulses of 1 µJ energy have been reported [12]. In a different context, HC-PCF filled with molecular gases offers excellent performance as an ultra-low threshold modulator and frequency shifter for nano- and picosecond laser pulses [14, 21].

Despite the success of solid-core PCFs in generating supercontinuum spectra from the mid infrared (IR) to the near ultraviolet (UV), the short wavelength edge of such SC sources is limited to about 280 nm [6] by material absorption and the properties of the silica glass used. Furthermore, even at deep blue wavelengths the glass suffers cumulative optical damage, resulting in deterioration of the supercontinuum. Currently a spectral gap in broadband SC sources exists between the near-UV and the vacuum-UV (VUV). Although soliton self-compression in kagomé-style hollow-core PCF filled with noble gases has been used to demonstrate the emission of dispersive waves at wavelengths from the visible to the VUV (at 176 nm), the generated light has bandwidths of order about 10 nm or less [9].

Mamyshev et al. have described another scheme that combines both frequency conversion and pulse compression [20]. The pulse perceives decreasing dispersion in a single-mode silica fiber due to the Raman-induced soliton self-frequency downshift, which results in an adiabatic soliton compression. However, this technique is restricted to a frequency down-conversion, and it does not allow a frequency up-conversion. As a further limitation, a very small compression factor was observed only (96 fs to 55 fs) due to a small Raman-induced frequency shift (1.57 µm to 1.62 µm) and a decreasing effective nonlinearity resulting from the frequency downshift.

Further previous works have excited Raman states in a gas filled fibre, in the anomalous dispersion regime, but with long pulses (usually ~1 ns) ([21], [14]), which do not allow a supercontinuum generation. Ultrashort pulses have been used in [19] and [22] without being capable of obtaining supercontinuum spectra.

Objective of the Invention

The objective of the invention is to provide an improved method of spectrally broadening light pulses (or: temporarily compressing light pulses) avoiding limitations of conventional techniques. In particular, the objective of the invention is to provide an improved method of generating light pulses each covering a broader range of frequencies, with reduced requirements as to procedural conditions, improved long-term stability and/or simplified controllability. Furthermore, the objective of the invention is to provide an improved light pulse source device avoiding limitations of conventional techniques. In particular, the light pulse source device is to be provided with reduced complexity, increased robustness and/or improved controllability.

SUMMARY OF THE INVENTION

According to a first general aspect of the invention, the above objective is solved by a method of spectrally broadening light pulses, wherein initial light pulses (laser pulses, optical pump pulses, input radiation) having a pulse duration below 1 ps, preferably below 500 fs, particularly preferred below 100 fs, e.g. down to 30 fs, are created with a laser source (pump source device) and in-coupled into a hollow optical waveguide device, which contains a Raman active pulse guiding medium. During propagation in the pulse guiding medium along the optical waveguide device, the light pulses are subjected to a Raman nonlinearity resulting in a spectrally broadening of the light pulses via an excitation of a Raman polarization having a first Raman period. The light pulses are spectrally broadened compared with the spectrum of the initial light pulses coupled into the optical waveguide device. Optionally, the light pulses additionally can be subjected to a Kerr nonlinearity (optical Kerr effect) during propagation in said pulse guiding medium along the optical waveguide device, so that the spectrally broadening of the light pulses additionally can be enforced via the Kerr nonlinearity.

According to the invention, the optical waveguide device together with the pulse guiding medium provides an anomalous (negative) group velocity dispersion (GVD). Under the effect of the anomalous group velocity dispersion and in combination with the spectral broadening of the light pulses, a Raman-enhanced self-compression of the light pulses is induced. Furthermore, according to the invention, the light pulses continuously propagate along the optical waveguide device such that the Raman-enhanced self-compression results in a further excitation of a Raman polarization having a second Raman period which is faster than the first Raman period, resulting in a further spectral broadening of the light pulses up to a supercontinuum spectrum including vacuum UV wavelengths, in particular wavelengths less than 300 nm, preferably less than 250 nm, particularly preferred less than 200 nm, e.g. 150 nm or less, down to 120 nm. Preferably, the supercontinuum spectrum covers a spectral range from infrared, e.g. about 2 µm, or even from far infrared (about 10 µm) down to the vacuum UV wavelengths.

According to a second general aspect of the invention, the above objective is solved by a light pulse source device, which comprises a laser source for providing light pulses having a pulse duration below 1 ps, and a hollow optical waveguide device with an input end and an output end, containing a Raman active pulse guiding medium and being capable of propagating the light pulses and subjecting the propagating light pulses to a Raman nonlinearity (and optionally a Kerr nonlinearity). The laser source is arranged for in-coupling the light pulses into the input end of the optical waveguide device and the optical waveguide device is configured such that the light pulses propagating along the pulse guiding medium are spectrally broadened via excitation of a Raman polarization having a first Raman period. According to the invention, the optical waveguide device and the pulse guiding medium are configured such that an anomalous group velocity dispersion is provided to the light pulses travelling along the optical waveguide device, thus resulting in a Raman-enhanced self-compression of the light pulses. Furthermore, according to the invention, the optical waveguide device has a longitudinal length selected such that the light pulses further can propagate along the pulse guiding medium such that the Raman-enhanced self-compression results in a further excitation of a Raman polarization having a second Raman period which is faster than the first Raman period. Advantageously, this results in a further spectral broadening of the light pulses up to a supercontinuum spectrum including vacuum UV wavelengths. Preferably, the light pulse source device is adapted for conducting the method according to the first aspect of the invention.

Advantageously, the inventors have found a new way to exploit fast oscillations in the Raman active pulse guiding medium using the input light pulse that is originally longer than the molecular oscillation period. This allows the input radiation to interact with the coherent molecular oscillations it created. The result is a strong spectral blue-shift, in contrast to the red-shift of normal impulsive Raman scattering [20]. This process, which is called impulsive Raman self-scattering (IRSS), can be used for a coherent excitation of the vibrational transition of hydrogen (the fastest molecular motion in nature with a period of 8 fs) starting with near-IR pulses of duration 60 fs. Different pulse pre-compression schemes may also make this accessible to pulses of duration 100 to 500 fs.

According to a preferred embodiment of the invention, the pulse guiding medium comprises a Raman active gas, i.e. a molecular gas (non mono-atomic gas). Particularly preferred, the optical waveguide device is filled exclusively with hydrogen. Hydrogen has the advantage of having the highest vibrational frequency of any molecule, while being both transparent down to the VUV and having a relatively high ionisation threshold, which is an important characteristic for efficient production of energetic sub-cycle pulses. Other molecular gases comprise e.g. $D_2$, $N_2$, $CH_4$, $CO_2$, $SF_6$, $O_2$.) Alternatively, the pulse guiding medium may include the Raman active gas and additionally a noble gas, like e.g. Ne. According to yet another alternative, the pulse guiding medium may comprise a Raman active liquid, like e.g. $CS_2$, liquid $N_2$, liquid $O_2$.

According to the invention, the supercontinuum spectrum is generated by a first step of exciting the first Raman mode having the first Raman period, which preferably is below 1 ps, particularly preferred below 500 fs, e.g. below 100 fs, and a second step of exciting the second Raman mode having the second, even shorter Raman period. According to a preferred embodiment of the invention, the first Raman period is a period of a rotational Raman state, while the second Raman period is a period of a vibrational Raman state of the pulse guiding medium.

Advantageously, there are multiple variants of designing the optical waveguide device which may comprise e.g. a photonic-crystal fiber (PCF), in particular a Kagomé fiber, a hypocycloid fiber or a square lattice fiber, an anti-resonant reflecting optical waveguide, or a capillary.

According to further preferred embodiments of the invention, the anomalous group-velocity dispersion of the optical waveguide device can be provided by at least one of the following measures. Firstly, an optical waveguide device can be used which has a core size which in combination with the pulse guiding medium in the optical waveguide device creates the anomalous group-velocity dispersion. Additionally, thermodynamic properties of the pulse guiding medium, in particular the pressure and temperature thereof in the optical waveguide device, and/or an excitation wavelength of the laser source (centre wavelength of the light pulses in-coupled into the optical waveguide device) can be adjusted. Preferably, the centre wavelength of the light pulses in-coupled into the optical waveguide device is at least 50 nm, in particular at least 150 nm, and/or at most 5000 nm, in particular at most 16000 nm.

Advantageously, the thermodynamic properties of the pulse guiding medium within the optical waveguide device can be controlled in dependency on at least one of a beam profile, a spectrum and an intensity of the light pulses out-coupled from the optical waveguide device. A first output control-loop can be provided which includes at least one output detector device and a pressure and/or temperature setting device, wherein the pressure and/or temperature of the pulse guiding medium is adjusted such that the out-coupled light pulses have the supercontinuum spectrum and a predetermined spatial profile, e.g. a fundamental waveguide mode.

According to a particularly preferred embodiment of the invention, the step of in-coupling the light pulses includes a geometrical alignment of a beam path of the light pulses provided by the laser source with the input end of the optical waveguide device such that predominantly, preferably at least 60%, a fundamental mode (light field mode) of the optical waveguide device is excited in the optical waveguide device. Advantageously, the geometrical alignment can be controlled in dependency on at least one of a beam profile, a spectrum and an intensity of the light pulses out-coupled from the optical waveguide device. Thus, a second output control-loop can be provided which includes the at least one output detector device and a waveguide setting device and/or plane steering mirrors, wherein the position of the input end of the optical waveguide device and/or the beam path of the pump light pulses is adjusted such that the out-coupled light pulses have the supercontinuum spectrum and a predetermined spatial profile, e.g. a fundamental waveguide mode. Preferably, the waveguide setting device comprises a three-axis support stage carrying the optical waveguide device. The first and second output control-loops can be combined as a common control-loop.

Furthermore, for further optimizing of the device performance, the light pulses can be provided with a chirp and/or the light pulses can be subjected to a pre-compression in a pre-compression stage arranged between the laser source and the optical waveguide device. Preferably, the pre-compression stage comprises a pre-compression chirped mirror assembly, a pre-compression waveguide and/or a grating-based pre-compression device. With the pre-compression waveguide, a soliton-based pulse compression can be conducted, e.g. as described in [11].

According to a further advantageous embodiment of the invention, an intensity, the pulse duration and/or a linear chirp of the light pulses in-coupled to the optical waveguide device can be controlled in dependency on a beam profile and temporal shape thereof such that the light pulses propagating in the optical waveguide device are subjected to the anomalous group-velocity dispersion and the Raman nonlinearity. Accordingly, an input control-loop can be provided which includes at least one input detector device and a laser source setting device, wherein the intensity, the pulse duration and/or the linear chirp of the light pulses is adjusted such that the anomalous group-velocity dispersion and the Raman nonlinearity are created in the optical waveguide device.

According to the invention, the light pulses are compressed up to a supercontinuum spectrum. For minimizing optical attenuation, the light pulses with the supercontinuum spectrum preferably are out-coupled through a vacuum UV transparent window, made of e.g. $MgF_2$ or $CaF_2$, or through an open end of the optical waveguide device. Furthermore, the light pulses preferably are out-coupled into a vacuum system or into a vacuum UV transparent medium, like e.g. N.

With particularly preferred features of the invention, the initial pump light pulses are compressed in a hollow-core PCF filled with a Raman-active gas, like $H_2$ to induce super-spectral-broadening of the light pulses. The invention preferably combines the electronic Kerr nonlinearity with the Raman nonlinearity of the gas to create a spectrally tunable super-broadening of the input radiation. The input radiation acts on the molecular degrees of freedom of the gas, and these act back on the light so as to dramatically broaden the spectrum. The input radiation may be in the form of a single or a sequence of ultra-short (about 1 to 500 fs) pulses, in the wavelength range about 50 nm to 3000 nm. Since the group velocity dispersion of the gas-filled PCF can be conveniently tuned by varying the gas pressure, the pulse dynamics and the characteristics of the spectral super-broadening (coherence, spectral extent) can be adjusted. Further tuning is possible by changing the parameters of the input radiation, e.g., energy, temporal form or frequency chirp. The system is capable of generating spectral super-broadening from the far infrared (about 10 μm) to the vacuum and extreme ultraviolet (VUV-XUV, about 50 nm).

The inventive light pulse source device utilises the characteristic dispersion and loss profile of the broadband-guiding hollow-core photonic crystal fibre in conjunction with the molecular degrees of freedom (e.g. rotation and/or vibration) in the gas loaded into the fibre, so as to access the ultrafast molecular dynamics in a controlled way and consequently achieve spectral super-broadening of the input radiation. Preferably, fast molecular oscillations (periods of order about 10 fs) are used for frequency conversion as they provide large frequency shifts (about 100 THz). In order to impulsively drive these oscillations, energetic ultrashort pulses are required. Depending on the system, the energies required can range from several mJ in free space to only a few μJ in the gas-filled PCF. In what is known as impulsive Raman scattering (IRS), an ultrashort pulse with duration shorter than the Raman period may directly excite these oscillations. Due to the short pulse duration, however, the pulse itself does not benefit from the coherent molecular oscillations wave it creates. Since in this process each pump photon gives up a fraction of its energy to molecular vibrations, the average frequency of the pulse shifts continuously to lower frequencies.

In summary, the main advantages of the invention are:
- simplicity (everything is done with one pulse in one fibre (a pump-probe scheme would work but would require two pulses),
- super-broad spectrum (covering a range of frequencies that other techniques either cannot cover or require special conditions to do so, such as single-cycle pump pulses or cumbersome experimental arrangements),
- robustness and flexibility in choice of pump pulse parameters, such as chirp and duration. Numerical simulations show that the compression quality is insensitive to the pump pulse duration and chirp, i.e., these parameters have no or little effect on the output spectrum. This is extremely interesting as it would allow generation of high-average power, high repletion rate UV-DUV supercontinuum sources using commercially available ultrashort fibre lasers,
- the light pulse source device shows no optical damage and is stable over time, and
- contrary to existing DUV and VUV sources, which produce relatively narrow-band light (see e.g. [23, 24]), the invention provides a supercontinuum spectrum covering two, three or even four octaves.

BRIEF DESCRIPTION OF THE DRAWINGS

Further details and advantages of the invention are described in the following with reference to the attached drawings, which show in.

PREFERRED EMBODIMENTS OF THE INVENTION

The invention uses a pulse guiding medium that provides a Raman nonlinearity and optionally the optical Kerr effect. The pulse guiding medium has an anomalous dispersion within part of the wavelength range of its operation. Such conditions can be achieved e.g. in a gas-filled hollow waveguide, such as a hollow-core PCF. Preferred embodiments of the invention are described in the following with exemplary reference to the use of the Kagomé-lattice PCF. However, it is emphasized that the invention also can be implemented using other types of hollow optical waveguide devices, like other PCFs or capillaries.

Furthermore, it is emphasized that the invention is not restricted to the presented examples and operation parameters, but rather can be implemented with modified conditions, in particular in view of the description of excitation of Raman coherence presented below. With the practical application of the invention, the optical setups of the illustrated embodiments can be modified, e.g. for out-coupling the broadened pulses to an application site, e.g. for measurement purposes.

Light Pulse Source Device

Figure 1:
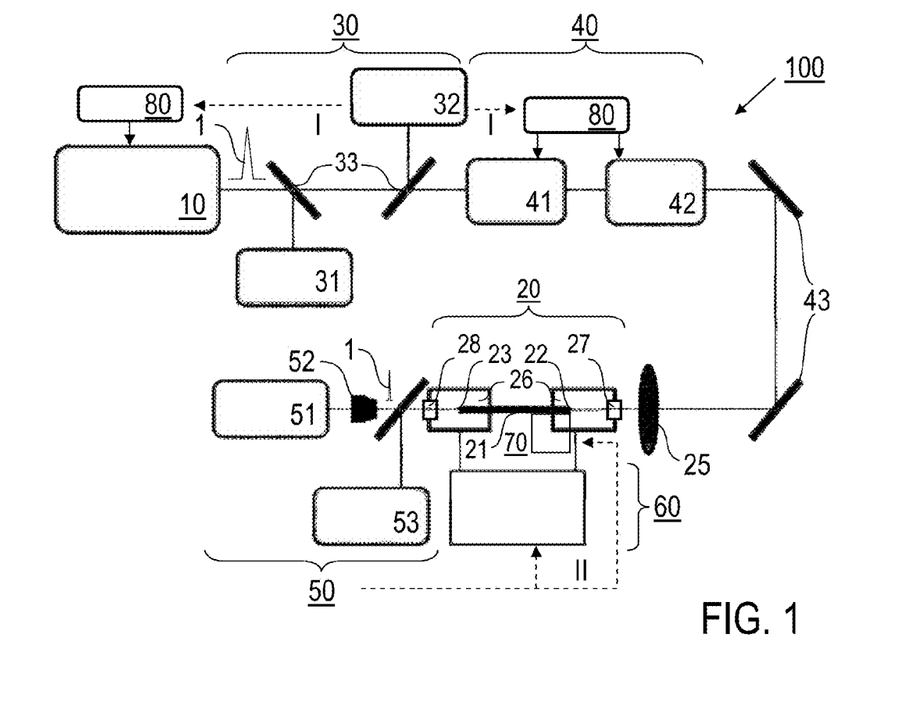
FIG. 1: a schematic illustration of a preferred embodiment of a light pulse source device according to the invention.
Figure 2:
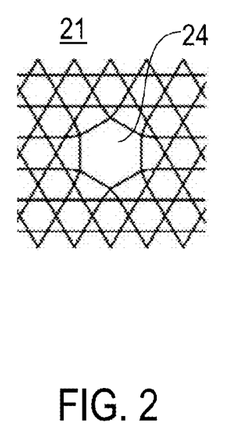
FIG. 2: a cross-sectional representation of a PCF used according to the invention.

FIG. 1 schematically illustrates an embodiment of a light pulse source device 100 comprising a laser source 10, a hollow optical waveguide device 20 including a pulse guiding medium 24 (see FIG. 2), an input detector device 30, a pulse shaping device 40, an output detector device 50, and a pressure and/or temperature setting device 60, a waveguide setting device 70 and a laser source setting device 80. An input control loop I can be provided with the components 30 and 80, and one or two output control loop(s) II can be provided with the components 50 and 60/70. Additionally, a pre-compression stage (not shown) can be provided for compressing light pulses created by the laser source 10 before in-coupling into the optical waveguide device 20.

The laser source 10 comprises e.g. a 1 kHz Ti:Sa CPA laser system (Legend Elite Coherent) delivering 30-fs light pulses 1 with energies up to few mJ and central wavelength at 805 nm. Pulses of a few μJ are created and controlled using an achromatic λ/2-waveplate and a glass wedge at the Brewster angle (not shown). Preferably, the initial light pulses 1 have a duration such that the bandwidth of the light pulses 1 is larger than $\frac{1}{10}$ of the smallest Raman frequency shift of the pulse guiding medium 24. The energy is in a range of e.g. 1 nJ to 1 mJ, depending on core size of the optical waveguide device 20, an ionization threshold of the pulse guiding medium 24, a pressure of the pulse guiding medium 24 and a Raman gain of the pulse guiding medium 24.

The optical waveguide device 20 comprises a Kagoméhollow core PCF 21 with an input end 22 and an output end 23. The PCF 21 is fabricated using a stack-and-draw technique and has a core diameter of 25 μm, a pitch of 13.4 μm and a core-wall thickness of about 150 nm, estimated from the scanning electron micrograph in FIG. 2. The loss of the optical waveguide device 20 is about 1 dB·m$^{-1}$ at 800 nm, and its spectral dependence can be measured using the cut-back technique. The core of the PCF 21 is filled with the pulse guiding medium 24, e.g. hydrogen.

The PCF 21 is fitted in two sealed gas cells 26, which have a fluid communication with the pressure and/or temperature setting device 60. The input and output ends 22, 23 of the PCF 21 are open in the gas cells 26, and the whole system is filled with hydrogen at uniform pressure, e.g. 5 bar. The gas cells 26 have an in-coupling window 27 and an out-coupling window 28. The in-coupling window 27 is made of e.g. MgF$_2$ with a thickness of 1 mm. The out-coupling window 28, e.g. made of MgF$_2$ with a thickness of 1 mm, is transparent in the IR-VUV wavelength range and placed at about 5 cm from the output end 23. The out-coupling window 28 has a transmission range from IR down to VUV with about 81% transmission at 122 nm. As an alternative, the PCF 21 can be arranged in a single gas cell (not shown) accommodating the complete PCF 21.

The pressure and/or temperature setting device 60 includes a controllable gas reservoir (not shown). The pressure in the gas cells 26 is controlled e.g. with valves at the gas reservoir and measured with manometers (details not shown). Furthermore, the temperature of the pulse guiding medium in the OCF 21 can be controlled with a heating or cooling unit of the pressure and/or temperature setting device 60.

Figure 3:
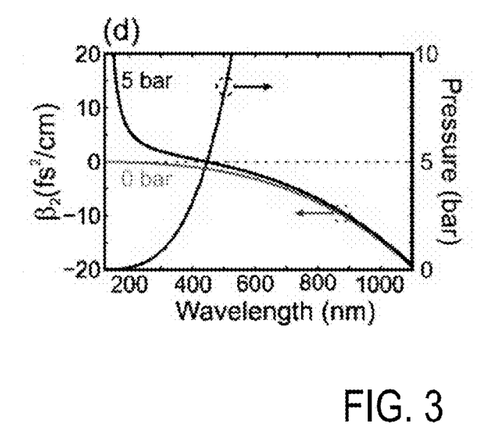
FIG. 3: a graphical illustration of the group velocity dispersion in a PCF.

The gas pressure in PCF 21 and the core size of PCF 21 are chosen so as to achieve anomalous dispersion (negative $\mu_2$). The dispersion is influenced by the pulse guiding medium, e.g. by the fiber geometry and the gas therein. For PCF's, in the practically used range the dispersion is mainly a function of the core diameter. The contribution of the gas is a function of the chosen species and the pressure. In the practically used wavelength range, the contribution is usually anomalous, whereas the gas contribution is normal—allowing for a careful balance of the overall dispersion. As an example, FIG. 3 illustrates a numerical simulation, wherein the calculated group velocity dispersion $\mu_2$ is plotted against wavelength (abscissa) for an evacuated PCF 21 (lower curve) and a PCF 21 filled with hydrogen at 5 bar pressure (upper curve). The right-hand axis indicates the hydrogen pressure needed to produce a given zero-dispersion wavelength, plotted against that wavelength.

Pulse parameters of the light pulses 1 created with the laser source 10 and in-coupled to the PCF 21 are monitored with the input detector device 30, which comprises an input beam profiler device 31, e.g. a CCD camera, and a pulse shape diagnostic device 32, e.g. a FROG autocorrelator. The light pulses 1 can be monitored continuously if semi-transparent mirrors 33 are used. Otherwise, the mirrors 33 can be removable during the stable operation of the light pulse source device 100.

The pulse shaping device 40 comprises a dispersion compensation device 41, including e.g. dispersive optics like multidielectric chirped mirrors (see FIG. 5) and a polarization and energy control device 42. Reflections from the pair of chirped mirrors are used to compensate for the second order dispersion induced by the beam path in air and in the optics. Preferably, the chirp of the light pulses 1 before in-coupling into the PCF 21 is small enough to be compressed by the linear and nonlinear dispersion of the gas-filled fibre. As an upper limit, a time-bandwidth product (TBP)<5 can be used.

The light pulses 1 are coupled via optional plane mirrors 43 into the fundamental mode of the PCF 21 using an achromatic-doublet lens 25, with launch efficiencies above 80% (defined as the ratio of the output power to the input power just before the PCF 21 input end 22). The linear coupling efficiency is carefully checked before and after each operation of the light pulse source device 100. Although the input end 22 could easily be damaged by accidental misalignment of the launch optics, in particular lens 25, or laser pointing instabilities, no damage was seen inside the PCF 21 core, which is the very place where the highest intensities occur and the VUV light is generated.

The output detector device 50 comprises an output beam profiler device 51, e.g. a CCD camera provided with a microscope objective 52 for imaging the mode profile at the PCF 21 output end 23, and a power meter 53. Furthermore, the output detector device 50 may comprise at least one spectrometer (see FIG. 5). During the regular operation of the light pulse source device 100, the out-coupled, spectrally broadened pulses 1 can be deflected via an additional mirror (not shown) to a location application thereof.

Figure 4:
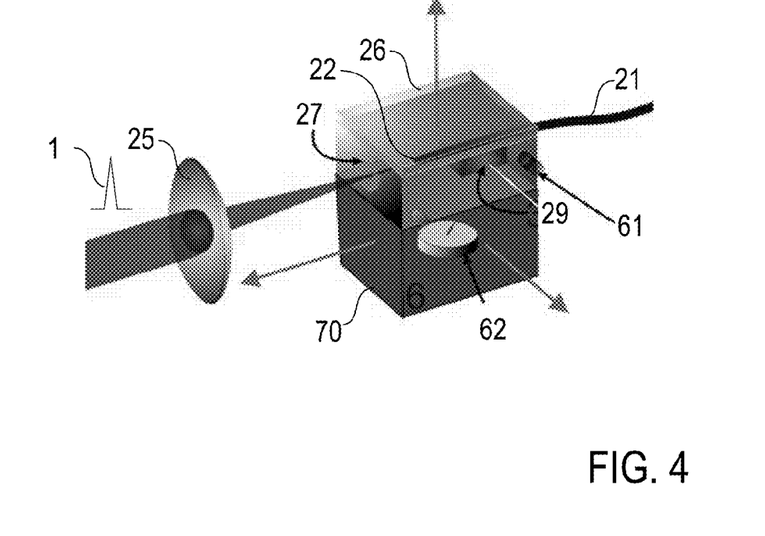
FIG. 4: a schematic perspective view illustration the in-coupling of light pulses into the PCF.

The waveguide setting device 70 comprises a translation stage carrying the PCF 21 or at least the input end 22 thereof (see FIG. 4). The laser source setting device 80 comprises a control unit which is capable of adjusting the intensity, the pulse duration and/or the linear chirp of the light pulses and which is coupled with the laser source 10 and/or the pulse shaping device 40, respectively.

With the input control loop I, the laser source 10 and/or the pulse shaping device 40 can be adjusted in dependency on a beam profile and temporal shape measured with the input detector device 30 such that the light pulses 1 propagating in the optical waveguide device 20 are subjected to the anomalous group-velocity dispersion and the Raman nonlinearity. Furthermore, with the output control loop(s) II, the thermodynamic properties of the pulse guiding medium 24 within the optical waveguide device 20 (using the device 60) and/or the geometrical alignment (using the device 70 and the mirrors 43) can be controlled in dependency on the beam profile, spectrum and/or the intensity of the light pulses out-coupled from the optical waveguide device 20.

According to a preferred embodiment of the invention, the light pulse source device 100 of FIG. 1 can be provided as a one stage device, if the initial light pulses 1 with sufficiently short duration are created by the laser source 10 directly (i.e. with no further optimization of their characteristics), and they are coupled into the PCF 21 filled with the Raman-active gas or a mixture of Raman-active and noble gases. Raman-enhanced self-compression of the pulses reduce their duration below the period of molecular motion, causing super-spectral-broadening via IRSS, as explained below. If required, the parameters of the input radiation, e.g. chirp, duration, energy, etc., can be tuned with the pulse shaping device 40 for further optimization of the device performance.

According to alternative embodiments of the invention, the light pulse source device 100 of FIG. 1 can be provided as a two or several stages device. If the initial light pulses 1 with duration initially longer than the period of molecular motion of the filling gas, are first passed through a pre-compression stage for nonlinear spectral broadening and compression, e.g. according to [8], [9] or [11] or another, e.g. dispersion based pulse compressor. The pre-compression stage can be arranged between the laser source 10 and the pulse shaping device 40. After optimisation of their temporal duration, the compressed pulses are then launched into the PCF 21 filled with the Raman-active gas or the mixture of Raman-active and noble gases (as in FIG. 1).

With reference to FIG. 4, the light pulses 1 into the OCF 21 can be in-coupled via the achromatic-doublet lens 25 to the PCF 21 as follows. FIG. 4 shows the gas cell 26 at the input side of the PFC 21. The gas cell 26 includes a V-groove fiber holder 29 supporting the PCF 21 so that the input end thereof faces to the in-coupling window 27. Furthermore, the gas cell 26 is provided with a gas inlet 61 for a connection to the pressure and/or temperature setting device 60 and with a pressure gauge 62 for pressure monitoring within the gas cell 26. The V-groove fiber holder 29 is arranged on a three-axis stage providing the waveguide setting device 70 shown in FIG. 1.

The in-coupling procedure includes the following steps:
1. The beam profile and temporal shape of the light pulses 1 created by the laser source 10 are respectively characterized with the beam profiler device 31 and the shape diagnostic device 32 as shown in FIG. 1.
2. From the measure with the beam profiler device 31, the beam radius is estimated as $w=\frac{1}{2}\cdot(w_{min}+w_{max})$, where $w_{win}$ and $W_{min}$ are respectively the minimum and maximum beam radii measured.
3. The band-limited time duration (overall bandwidth of the pulse) and linear temporal chirp are estimated using the pulse shape diagnostic device 32. With specific set of suitably dispersive optics 41 (see FIG. 1, e.g. multidielectric mirrors), in-air beam path length and thickness of the in-coupling window and in-coupling lens 25, the time duration and linear chirp of the pulses 1 can be tuned.
4. From a scanning electron micrograph, the mean apothem of the hexagonal core structure is estimated as $r=\frac{1}{3}\cdot(r_1+r_2+r_3)$ with $r_1$, $r_2$, $r_3$ indicating the three apothems along the three principal axis of the PCF 21 core. Then, the optimal focal length of the in-coupling achromatic lens 25 is estimated using $$f_{opt} = \frac{\pi wr}{\lambda M^2}\sqrt{\frac{2\sqrt{3}}{\pi}},$$

where $\lambda$ is the laser central wavelength and $M^2$ is the M-squared factor. As an example, the parameters $M^2$ 1,$\lambda$=805 nm, w=2.6 mm, r=25.3 μm result in an optimal focal length of 135 mm ($M^2$=1.0).
5. The PCF 21 holder 29 (see FIG. 4) is roughly aligned using the two steering mirrors 43 in FIG. 1. Then using a moderate laser power (<300 μW) the PCF 21 is aligned, by finely tuning the two mirrors 43.
6. The input light pulses 1 are coupled into the fundamental mode of the PCF 21 by fine tuning the optical beam direction, using the mirror 43, and by changing the position of the input tip of the fiber with the three axis stage 70 (see FIG. 4). This procedure is accomplished by imaging the fiber output with the objective microscope 52 (see FIG. 1) and the beam profiler device 51 and/or by maximizing at the same time the output power measured with the power meter 53.

Once the optimal condition is found, the coupling efficiency (defined as the ratio between power at the output to the power at input of the fiber) is estimated from a linear fit of the experimental data taken at different input powers (<500 μW). Preferably, this procedure is repeated every time the pressure in the gas system or the beam alignment is changed.

Figure 5:
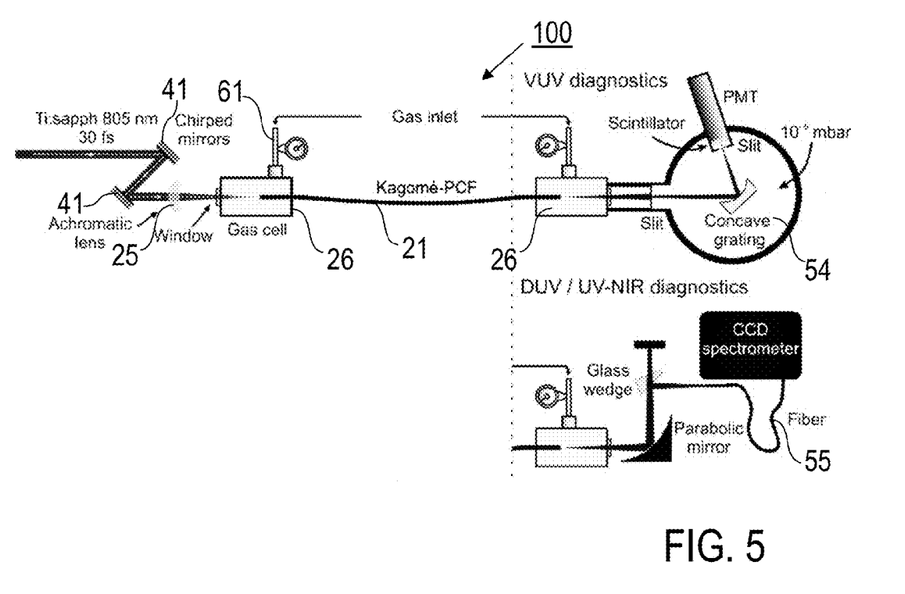
FIG. 5: a schematic illustration of further features of a light pulse source device according to the invention.

FIG. 5 illustrates the combination of the inventive light pulse source device 100 with at least one spectrometer 54, 55 being optionally arranged for monitoring the spectrum of the light pulses broadened according to the invention. Due to the extreme broad spectral range, different spectrometer types can be provided for. At least one of the spectrometers 54, 55 or another spectrally sensitive detector can be used for testing whether the design and operation conditions of the light pulse source device 100 are selected such that the supercontinuum spectrum including vacuum UV wavelengths is generated.

The light pulse source device 100 is shown with the dispersive optics 41, the achromatic lens 25, the gas cells 26 accommodating the input and output ends of PCF 21 and being provided with the gas inlets 61 for the connection to the pressure and/or temperature setting device 60 (see FIG. 1). The PCF 21 is filled with hydrogen in the pair of gas-cells 26 with $MgF_2$ windows 27, 28. Ultra-short light pulses with few μJ are launched into the PCF 21 using the achromatic lens 25. The two chirped mirrors 41 compensate for pulse lengthening in air.

For diagnostics, preferably one of two spectrometers 54, 55 are used, wherein the first spectrometer 54 comprises an evacuated scanning monochromator (McPherson) equipped with a scintillator and a photomultiplier tube (PMT). The first spectrometer 54 is adapted for measuring the VUV spectrum of the broadened light pulses. The second spectrometer 55 includes an in-coupling UV-enhanced optical fibre and a parabolic mirror deflecting the broadened light pulses to a CCD spectrometer. The UV-NIR and DUV spectra are measured with the second spectrometer 55. Before the UV-enhanced optical fibre, the signal is attenuated by multiple reflections from several glass wedges.

The light emerging from the output end of the PCF 21 is monitored either using the evacuated VUV spectrometer 54 directly connected to the output gas-cell 26, or by attenuating the signal by reflection at one or more glass wedges and then coupling it into different fibre-based CCD spectrometer 55 using an off-axis parabolic mirror. The VUV spectrometer 54 is initially purged and then evacuated to a pressure of $10^{-5}$ mbar so as to prevent absorption in air. The spectral response of the VUV spectrometer 54 is calibrated. This can be done using the known grating diffraction efficiency, the known quantum efficiency of the scintillator detector and by estimating the divergence of the light emitted from the PCF 21 output end. The spectra obtained from the different spectrometers 54, 55 are combined by rescaling their overall spectral intensities so as to match in the overlap regions.

Figure 6:
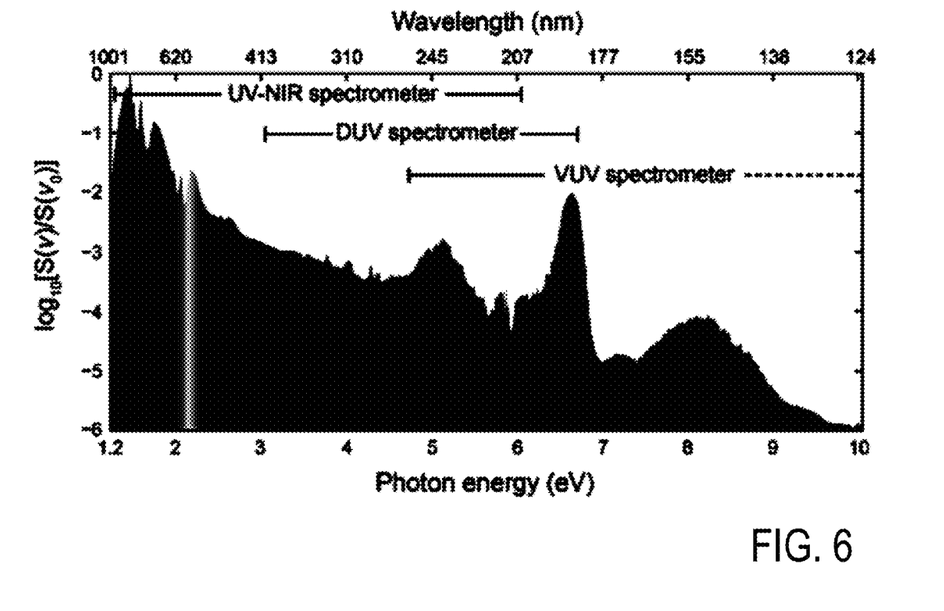
FIG. 6: a graphical presentation of a supercontinuum spectrum of light pulses created according to the invention.

The example of measured spectra (FIG. 6) shows that using the hydrogen-filled kagomé-PCF 21 as a vessel for stimulated Raman scattering, an ultra-broadband supercontinuum can be generated extending from 125 nm in the VUV to beyond 1200 nm in the IR. FIG. 6 shows a typical experimental spectrum obtained at the output of a 15 cm long PCF 21 with a 25 μm core diameter filled with hydrogen at 5 bar and pumped by a 30 fs pulse from a 1 kHz Ti:sapphire laser with only 2.5 μJ energy. The spectrum is obtained by calibrating the spectra taken with the spectrometers 54, 55 in the UV-NIR, the DUV and the VUV. The low frequency edge of the spectrum reaches the first vibrational Stokes line at 1200 nm, while its high frequency edge extends down to 125 nm (about 10 eV). As an important advantage of the invention, this is the first report of a supercontinuum spectrum that extends into the deep and vacuum UV. No degradation in the coupling efficiency, the transmitted spectral shape or the output power was observed even after weeks of lengthy operation using the same piece of PCF 21. This absence of optical damage makes the system a remarkable advance over sources based on solid-state materials.

Method of Spectrally Broadening Light Pulses

The mechanism behind the generation of the super-broadening as illustrated in FIG. 6 involves two main effects: Raman driven self-phase modulation, which at low values of anomalous dispersion drives soliton self-compression and self-steepening; and impulsive Raman self-scattering, which gives rise to strong molecular modulation and reshaping of the compressed input radiation. In this Raman-assisted pulse compression (spectral broadening), the input radiation propagates in the medium ("pulse guiding medium+waveguide geometry and material") where the group velocity dispersion (GVD) is anomalous and its magnitude decreases as a function of frequency. Input radiation with appropriate parameters (e.g. soliton order N between 1 and 20) coherently goes through a continuous increase in its bandwidth due to effects such as self-phase modulation (SPM) of the pump, 3rd and 5th harmonic generation, photoionization and/or the Raman effect (IRSS). In this scenario the input radiation duration may be comparable or shorter than the period (called first Raman period) of the slowest Raman mode of the filling gas (e.g. the rotational period of $H_2$ ($D_2$) is 57 (80) fs) so that it may drive this slow Raman excitation directly via IRS. This causes enhanced self-phase modulation (beyond that provided by the Kerr effect), which in combination with the anomalous dispersion in the waveguide device 20, results in pulse self-compression. Both the Raman and Kerr effects cause self-steepening of the pulse, leading to the development of an abrupt intensity "cliff" at the trailing edge of the input radiation as it propagates. This temporal feature first stretches the molecules and then abruptly lets them go, resulting in a strong excitation of the faster molecular degrees of freedom (called second Raman period), originally not accessible to the input radiation—the vibrational period of $H_2$ ($D_2$) is 8 (11) fs. The resulting excitation of the fast molecular oscillations modulates the trailing part of the input radiation, causing IRSS of the input radiation and its further spectral broadening to occur. As shown in FIG. 6, the overall spectrum covers the IR to the VUV-XUV spectral regions, lying in both anomalous and normal dispersion regimes of the gas-filled PCF 21. The lower wavelength edge is limited by the one-photon absorption, i.e., electronic resonances of the filling gas (about 80 nm in the case of $H_2$).

At the maximum compression point, the nonlinearity-induced extreme steepening at the trailing edge of the pulse results in its breakup and generation of a dispersive wave [12] in the normal GVD region. As a result the dispersive wave is delayed with respect to the input radiation and thus finds itself propagating in a medium with a pre-existing Raman polarization [13]. This results in a (delayed) four-wave mixing process, which leads to further continuous/discrete (e.g. sideband generation) increase in the bandwidth of the dispersive wave.

The following simplified mathematical analysis can be used for describing the physical mechanism of the invention. The current invention relies on the possibility of the light pulse to be able to excite an originally inaccessible, fast mode of molecular motion in a medium (second Raman period), while being effectively longer than the period of the desired molecular motion, $T_m$. For this to happen, the envelope of the electric field of the pulse requires to have a temporal feature that varies on a time scale shorter than T. The collective amplitude of theses oscillations, $\langle q \rangle$ follows the differential equation describing the dynamics of a driven damped oscillator, $$\langle \ddot{q} \rangle + \frac{2}{T_2} \langle \dot{q} \rangle + \Omega^2 \langle q \rangle = \frac{F(t)}{m}, \quad (1)$$

where $T_2$ is the dephasing time of the molecular coherence, m is the reduced mass of the oscillator, and $F(t)$ is the driving force proportional to the square of the driving electric field $F(t) = \kappa E(t)^2$, where $\kappa$ is a coupling coefficient. A simple Fourier transform (FT) of Eq. (1) shows that the component of $\langle q \rangle$ at frequency $\omega$ is given by, $$\langle q \rangle_\omega = \frac{\kappa}{m} \frac{FT[E(t)^2]}{\Omega^2 - \omega^2 - 2(i/T_2)\omega}. \quad (2)$$

Equation (2) shows resonance enhancement for $\omega \approx \Omega$. In the so-called "dicplasive" impulsive excitation in which the intensity profile of the excitation pulse $I(t) \propto E(t)^2$ contains a substructure that varies on a time scaled shorter than $T_m$, the Fourier transform of the pulse envelope has a component that oscillates at $\Omega$ and is capable of impulsive excitation of the Raman coherence. This is true even if the pulse duration itself is effectively longer than the $T_m$.

Figure 7:
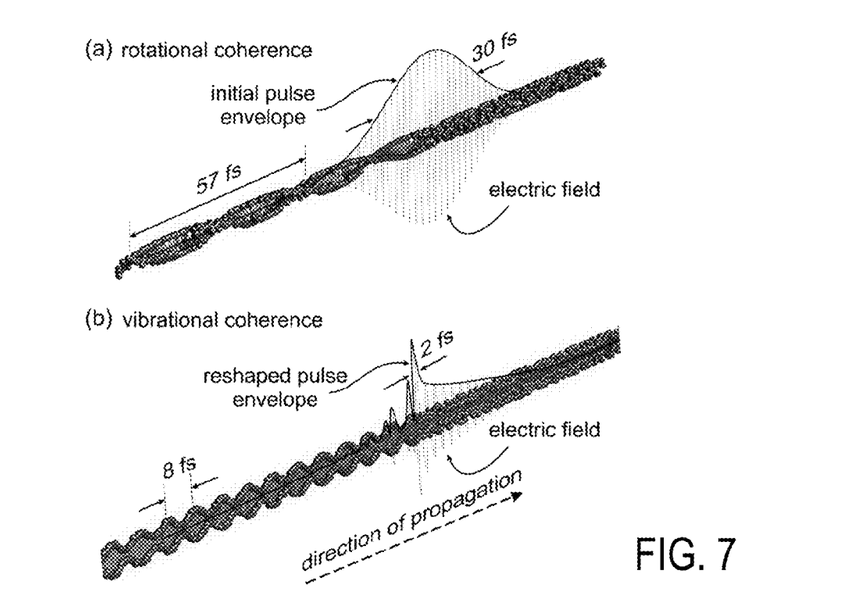
FIG. 7: a graphical presentation of the interaction of the light pulse with a molecule at various phases of pulse compression.

FIG. 7 represents various phases of the inventive pulse compression and reshaping for a transform limited 30-fs pulse with 2.5 µJ energy propagating along the hollow kagomé-PCF 21 with 25.3 µm core diameter and filled with 5 bar of hydrogen. According to FIG. 7(*a*) the original pulse bandwidth is large enough to impulsively excite the rotational Raman coherence wave with the period of 57-fs (first Raman period), leaving behind a trace of correlated spatiotemporal molecular motions. According to FIG. 7(*b*), as the pulse propagates further (thus temporally compressing more), due to the formation of a rapidly changing, asymmetric reshaped temporal feature, it is capable of displacive impulsive excitation of the previously inaccessible, fast (with period of 8-fs) vibrational coherence of hydrogen. At the exact maximum temporal compression point, the extremely short pulse durations attained (<2 fs) enable direct and efficient impulsive excitation of the vibrational Raman coherence (second Raman period). At this point spectral super-broadening happens.

Figure 8:
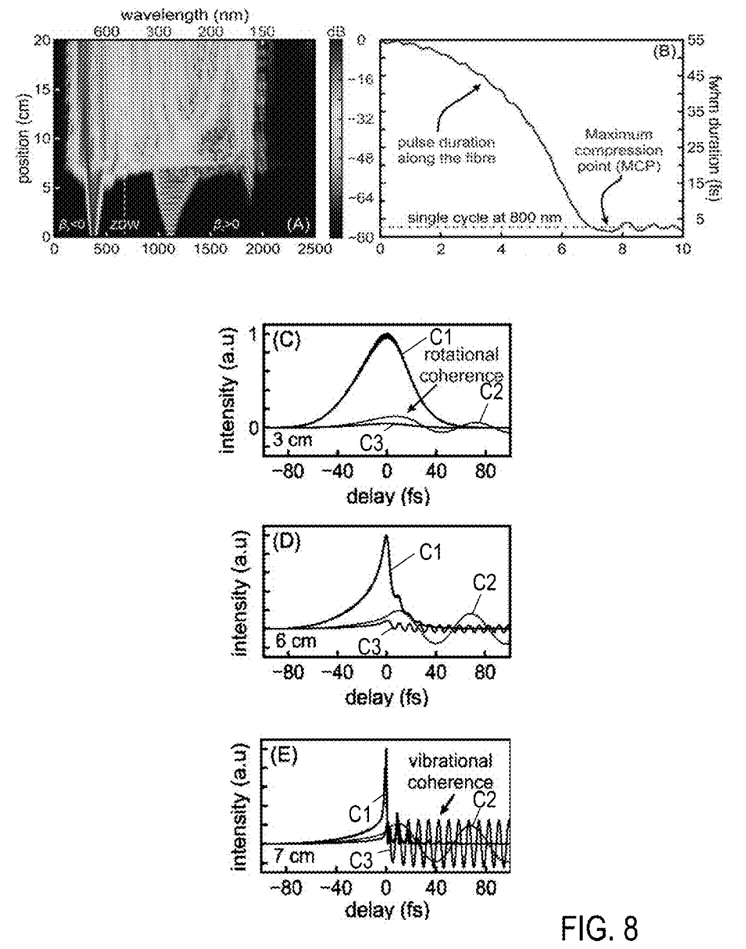
FIGS. 8 and 9: graphical presentations of experimental and numerical results obtained with the invention.
Figure 9:
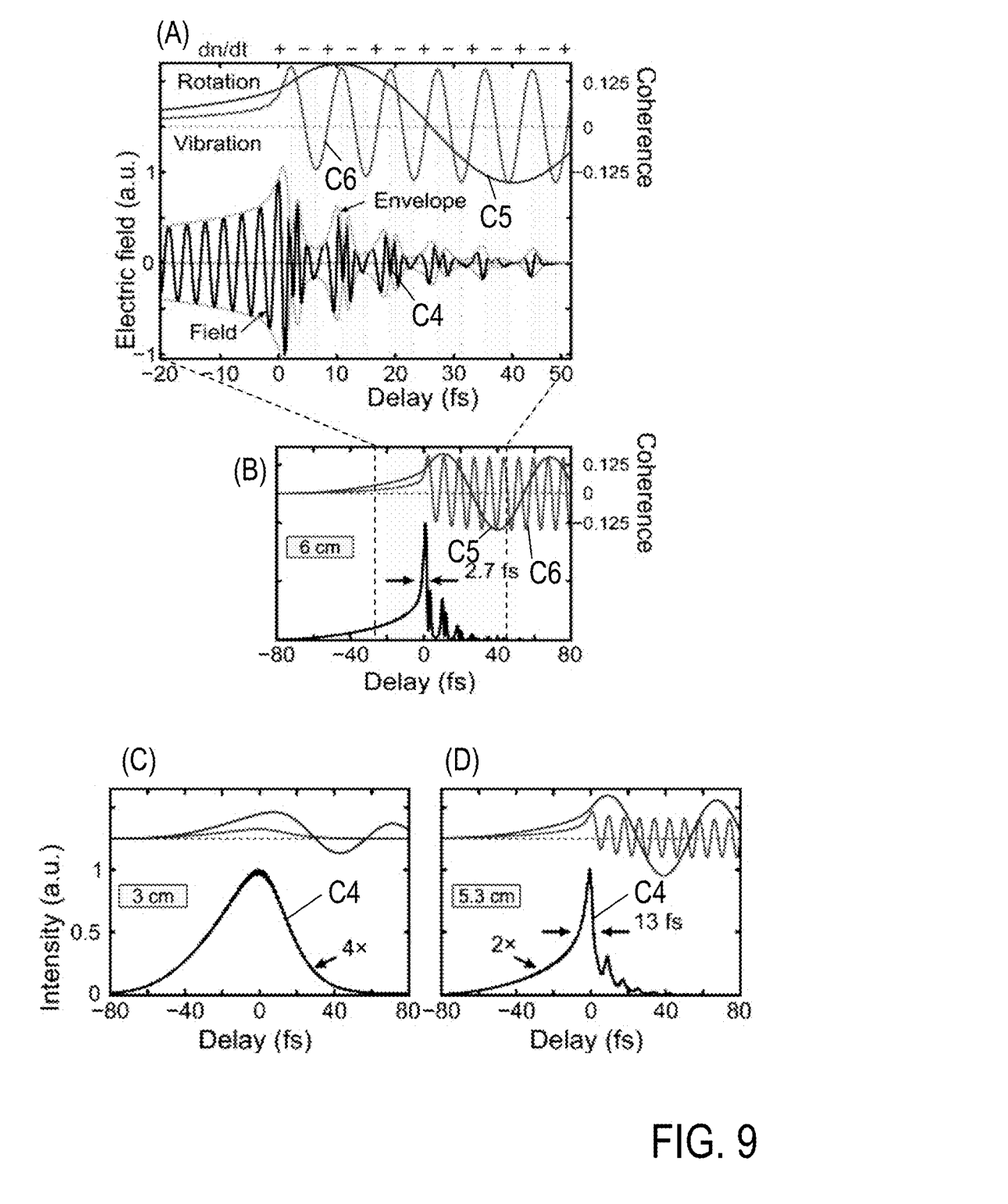

FIGS. 8 and 9 illustrate further experimental results and numerical descriptions of the invention. FIG. 8 shows numerical simulations of (A) the evolution of the spectrum with propagation distance, (B) the FWHM pulse duration as a function of propagation distance and (C-E) snapshots of the pulse intensity profile (C1), and the real part of the rotational (C2) and vibrational (C3) coherence at different distances along the fiber as indicated.

Numerical modelling the propagation of the pulse (FIG. 8A) is done using a unidirectional full-field equation without any slowly-varying envelope approximation. The Raman response is included using Maxwell-Bloch equations for the rotational and vibrational modes of hydrogen. The Gas-filled PCF 21 offers a pressure-tunable zero dispersion wavelength (ZDW) [12], which at the pressure used in the example (5 bar) sits at 445 nm (white dashed line in FIG. 8A). This means that the pump pulse propagates in a regime of weak anomalous dispersion, experiencing both self-compression and reshaping as it propagates. The modeled pulse duration of 55 fs at the input (FIG. 8B) is short enough to impulsively excite some rotational coherence (FIGS. 8C-8E). The Kerr effect, reinforced by rotational Raman excitation, causes self-steepening of the pulse, leading to the development of an abrupt intensity "cliff" at the trailing edge of the pulse as it propagates (FIG. 8D). In what has been named "displacive" excitation [19], this temporal feature first stretches the molecules and then abruptly lets them go on a time-scale shorter than one cycle of molecular vibration, resulting in strong vibrational coherence that phase modulates the trailing part of the pulse. This is followed by a sequence of similar but gradually weaker displacive events, spaced by the vibrational Raman period, further amplifying the vibrational coherence. This process of "impulsive Raman self-scattering" results in remarkable spectral broadening at the 7 cm point, as shown experimentally in FIG. 6 and numerically in FIG. 8A.

FIG. 9 shows numerical simulations presenting (A) the electric field of the pulse (as plotted in FIG. 8A), along with the rotational and vibration coherence, at the 6 cm point. Note the strong frequency modulation at the trailing edge of the pump pulse induced by the intense impulsive vibrational coherence, and (B-D) the envelope of the optical intensity (C4) together with the rotational (C5) and vibrational (C6) coherence waves at three different positions. Note that the rotational coherence induces a change in polarisability that is about 14 times smaller than that produced by the vibrational coherence.

Four terms contribute to the nonlinear refractive index of the gas: the instantaneous electronic Kerr effect, photoionization and subsequent free electron evolution, and the noninstantaneous Raman response of both rotational ($\Omega_{vib}/2\pi$=18 THz) and vibrational ($\Omega_{vib}/2\pi$=125 THz) molecular oscillations. These oscillations can be resonantly driven by the beat-note created by interfering two narrow-band lasers whose frequencies are spaced by the Raman frequency shift. They may also be impulsively driven by a single optical pulse of duration of order the Raman period ($T_{rot}$=57 fs, $T_{vib}$=8 fs) or less. In the example, the launched 30 fs pulse is already short enough to drive the rotational Raman excitation directly (this can be clearly seen in FIG. 9B). This causes enhanced self-phase modulation (beyond that provided by the Kerr effect) which, in combination with the anomalous dispersion, results in self-compression. Both the Kerr effect and rotational Raman excitation cause self-steepening of the pulse, leading to the development of an abrupt intensity "cliff" at the trailing edge of the pulse as it propagates (FIG. 9D). The "displacive" excitation results in strong vibrational coherence that phase modulates the trailing part of the pulse. The phase velocity of the resulting coherence wave is equal to the group velocity $v_g$ of the compressed pulse (i.e., slower than the carrier wave phase velocity) and has wavelength $2\pi v_g/\Omega_{vib}$. In a conventional phase modulator the carrier wave is instantaneously up and down-shifted in frequency in proportion to the time-derivative of the refractive index, i.e., $\Delta\omega(t) \propto -\partial n(t)/\partial t$. In a similar manner, the vibrational coherence produces a strong periodic frequency modulation of the carrier wave, as can be seen in FIG. 9A, where the instantaneous electric field of the light is plotted along with the rotational and vibrational coherence. In this region a succession of similar but gradually weaker displacive events take place, spaced by the Raman period, further amplifying the vibrational coherence (FIG. 9A). Similar localized intensity enhancements have previously been observed using a pre-prepared Raman coherence and have also been theoretically predicted in $CS_2$-filled hollow core PCF.

The third harmonic generation (from 805 to 268.3 nm) also may play a role in the evolution of the spectrum, because it overlaps spectrally with the 6th vibrational anti-Stokes band at 267.7 nm. Seeding a Raman process with harmonics of the pump that match an anti-Stokes line is known to push the spectrum deeper into the blue. This is further enhanced at 5 bar pressure, when the pump and third harmonic share similar group velocities. Additionally, due to the dispersion of the modal refractive index in kagomé-PCF, the anti-Stokes bands are better phase-matched than the Stokes bands. These factors explain the asymmetric spectral extent toward higher frequencies (numerical simulations with loss switched on and off show that the high loss band beyond 1050 nm plays only a minor role). It is also interesting that signals at frequencies above the zero dispersion point (such as the third and fifth harmonics and dispersive waves) have a smaller group velocity than the rest of the spectrum, with the result that they lag behind the main pulse and are modulated by the molecular coherence.

The inventive fibre-based supercontinuum source represents a breakthrough in the generation of broad-band DUV-VUV light, filling an availability gap in a spectral region very important in spectroscopy. If the light is produced in the gas-filled kagomé-PCF 21, it may also be flexibly delivered in the same fibre, neatly avoiding the problem of absorption in air. Additionally, the pump pulse requirements are readily available from high repetition rate (MHz) laser sources, providing a straightforward route to much higher average power and photon flux. It may also be possible to compress the supercontinuum spectrum to produce ultrashort pulses—the bandwidth required for a 1 fs transform-limited Gaussian pulse at 180 nm is 440 THz, equivalent to a bandwidth of 48 nm. Such short VUV pulses would enhance the temporal resolution available in fields such as two-dimensional ultrafast spectroscopy and analytical chemistry.

The features of the invention disclosed in the above description, the drawings and the claims can be of significance both individually as well as in combination for the realization of the invention in its various embodiments.

The invention claimed is:
1. A method of spectrally broadening light pulses, comprising the steps of
  providing the light pulses with a laser source, said light pulses having a pulse duration below 1 ps,
  in-coupling the light pulses into a hollow optical waveguide device including a Raman active pulse guiding medium, said light pulses being subjected to a Raman nonlinearity in the optical waveguide device, and
  spectrally broadening the light pulses propagating along the pulse guiding medium by subjecting them to the Raman nonlinearity via excitation of a Raman polarization having a first Raman period, wherein
  the optical waveguide device including the pulse guiding medium subjects the light pulses to anomalous group velocity dispersion which combines with the spectral broadening of the light pulses to result in a Raman-enhanced self-compression of the light pulses, and
  the light pulses further propagate along the optical waveguide device such that the Raman-enhanced self-compression results in a further excitation of a Raman polarization having a second Raman period which is faster than the first Raman period, resulting in a further spectral broadening of the light pulses up to a supercontinuum spectrum including wavelengths less than 300 nm.

2. The method according to claim 1, including at least one of the features:
    the pulse guiding medium comprises hydrogen,
    the pulse guiding medium additionally includes a noble gas,
    the first Raman period is below 1 ps,
    the first Raman period is a period of a rotational Raman state and the second Raman period is a period of a vibrational Raman state, and
    the optical waveguide device comprises a photonic-crystal fiber, in particular a Kagomé fiber, a hypocycloid fiber or a square lattice fiber, an anti-resonant reflecting optical waveguide, or a capillary.

3. The method according to claim 1, including the step of:
    setting the anomalous group-velocity dispersion of the optical waveguide device by at least one of selecting a core size of the optical waveguide device, adjusting thermodynamic properties of the pulse guiding medium within the optical waveguide device, and changing an excitation wavelength of the laser source.

4. The method according to claim 3, including the step of controlling the thermodynamic properties of the pulse guiding medium within the optical waveguide device in dependency on at least one of a beam profile, spectrum and an intensity of the light pulses out-coupled from the optical waveguide device.

5. The method according to claim 1, wherein the in-coupling step includes at least one of:
    geometrical alignment of the light pulses provided with the laser source and the optical waveguide device such that predominantly a fundamental mode is excited in the optical waveguide device,
    providing the light pulses with a chirp, and
    subjecting the light pulses to a pre-compression in a pre-compression stage.

6. The method according to claim 5, including the step of controlling the geometrical alignment of the light pulses provided with the laser source and the optical waveguide device in dependency on at least one of a beam profile, spectrum and an intensity of the light pulses out-coupled from the optical waveguide device.

7. The method according to claim 5, including the step of:
    controlling at least one of an intensity, the pulse duration and a linear chirp of the light pulses in dependency on a beam profile and temporal shape thereof such that the light pulses propagating in the optical waveguide device are subjected to the anomalous group-velocity dispersion and the Raman nonlinearity.

8. The method according to claim 1, including at least one of the steps of:
    out-coupling the light pulses with the supercontinuum spectrum through a vacuum UV transparent window or through an open end of the optical waveguide device,
    out-coupling the light pulses with the supercontinuum spectrum into a vacuum system, and
    out-coupling the light pulses with the supercontinuum spectrum into a system filled with a vacuum UV transparent medium.

9. A light pulse source device, comprising:
    a laser source, being adapted for providing light pulses having a pulse duration below 1 ps, and
    a hollow optical waveguide device with an input end and an output end, including a Raman active pulse guiding medium and being capable of propagating the light pulses and subjecting the propagating light pulses to a Raman nonlinearity,
    wherein the laser source is arranged for in-coupling the light pulses into the input end of the optical waveguide device, and
    the optical waveguide device is adapted for spectrally broadening the light pulses propagating along the pulse guiding medium by subjecting them to the Raman nonlinearity via excitation of a Raman polarization having a first Raman period,
        wherein the optical waveguide device including the pulse guiding medium is adapted for subjecting the light pulses to anomalous group velocity dispersion which combines with the spectral broadening of the light pulses to result in a Raman-enhanced self-compression of the light pulses, and
    the optical waveguide device has a length selected such that the light pulses further can propagate along the pulse guiding medium such that the Raman-enhanced self-compression results in further excitation of a Raman polarization having a second Raman period which is faster than the first Raman period, resulting in a further spectral broadening of the light pulses up to a supercontinuum spectrum including wavelengths less than 300 nm.

10. The light pulse source device according to claim 9, including at least one of the features:
    the pulse guiding medium comprises hydrogen,
    the pulse guiding medium additionally includes a noble gas, and
    the optical waveguide device comprises a photonic-crystal fiber, in particular a Kagomé fiber, a hypo-cycloid fiber or a square lattice fiber, an anti-resonant reflecting optical waveguide, or a capillary.

11. The light pulse source device according to claim 9, wherein:
    a pre-compression stage is arranged between the laser source and the optical waveguide device.

12. The light pulse source device according to claim 10, wherein:
    the pre-compression stage comprises at least one of a pre-compression chirped mirror assembly, a pre-compression waveguide and a grating-based pre-compression device.

13. The light pulse source device according to claim 9, wherein:
    a beam path subsequent to the output end of the optical waveguide device is transparent to vacuum UV.

14. The light pulse source device according to claim 9, wherein:
    the output end of the optical waveguide device has a vacuum UV transparent window or an open aperture.

* * * * *